(12) United States Patent
Gibbon et al.

(10) Patent No.: US 11,595,254 B2
(45) Date of Patent: *Feb. 28, 2023

(54) SYSTEMS AND METHODS TO CONTROL OPERATION OF VIRTUALIZED NETWORKS

(71) Applicant: AT&T Intellectual Property I, L.P., Atlanta, GA (US)

(72) Inventors: David Gibbon, Lincroft, NJ (US); Thomas Kirk, Califon, NJ (US); Behzad Shahraray, Holmdel, NJ (US); John Murray, Denville, NJ (US); Mazin Gilbert, Warren, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/027,889

(22) Filed: Sep. 22, 2020

(65) Prior Publication Data

US 2021/0006463 A1    Jan. 7, 2021

Related U.S. Application Data

(63) Continuation of application No. 15/666,143, filed on Aug. 1, 2017, now Pat. No. 10,812,329.

(51) Int. Cl.
| | |
|---|---|
| *H04L 41/00* | (2022.01) |
| *H04L 41/0816* | (2022.01) |
| *H04L 43/08* | (2022.01) |
| *G06F 9/455* | (2018.01) |
| *H04L 43/0817* | (2022.01) |
| *H04L 41/0823* | (2022.01) |

(52) U.S. Cl.
CPC ...... *H04L 41/0816* (2013.01); *G06F 9/45558* (2013.01); *H04L 41/0823* (2013.01); *H04L 41/20* (2013.01); *H04L 43/08* (2013.01); *H04L 43/0817* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | |
|---|---|---|
| 9,147,072 B2 | 9/2015 | Fawaz et al. |
| 9,553,772 B2 | 1/2017 | Dasgupta et al. |
| 9,830,193 B1 | 11/2017 | Wagner et al. |
| 2009/0327172 A1 | 12/2009 | Liu et al. |
| 2012/0246638 A1 | 9/2012 | He et al. |
| 2014/0019965 A1 | 1/2014 | Neuse et al. |
| 2015/0309493 A1 | 10/2015 | Patel et al. |

(Continued)

FOREIGN PATENT DOCUMENTS

KR    2007-0061260 A    6/2007

*Primary Examiner* — Angela Nguyen
(74) *Attorney, Agent, or Firm* — Guntin & Gust, PLC; Atanu Das

(57) ABSTRACT

An intelligent agent monitors operation of at least one software virtualized network (VN). Context information associated with the VN is used to analyze a state of the VN. At least one configuration change is caused to the VN in response to analysis of the state of the VN. A change is identified to the state of the VN caused by the configuration change. A determination is made as to whether or not the change to the state of the VN is an improvement to operation of the VN. A response to the determination is made by causing at least one other configuration change to the VN.

20 Claims, 7 Drawing Sheets

(56) References Cited

U.S. PATENT DOCUMENTS

2016/0026631 A1 1/2016 Salam et al.
2016/0267384 A1 9/2016 Salam et al.
2017/0006141 A1 1/2017 Bhadra
2017/0019302 A1 1/2017 Lapiotis et al.
2017/0063621 A1 3/2017 Sanneck et al.

SYSTEMS AND METHODS TO CONTROL OPERATION OF VIRTUALIZED NETWORKS

CROSS REFERENCE TO RELATED REFERENCES

This application claims the benefit of U.S. NonProvisional patent application Ser. No. 15/666,143, filed on Aug. 1, 2017, entitled "Systems and Methods to Control Operation Of Virtualized Networks," the contents of which are hereby incorporated by reference herein.

TECHNICAL FIELD

This disclosure relates generally to network management and, more specifically, to management of virtualized networks (VNs), such as software defined networks (SDNs).

BACKGROUND

Telecommunication networks have migrated from using specialized networking equipment executing on dedicated hardware, like routers, firewalls, application specific servers, and gateways, to reconfigurable networks, such as software defined networks (SDNs), executing as virtualized network functions (VNFs). VNFs are a set of virtual machines (VMs) that are instantiated on general purpose hardware. For a virtualized network to function efficiency, it is important that the hardware resources of its underlying cloud infrastructure be managed efficiently.

As the scope of virtualized networks continue to grow so will the complexity in trying to manage such networks. The sheer volume of VMs and VNFs and corresponding hardware resources will make management of resources an increasingly complex undertaking. At a certain scope, it is conceivable that human intervention in the control of such networks will no longer be feasible due to the complexities inherent in such networks. Therefore, there is a need for the systems and methods described in the present disclosure for managing software defined networks.

SUMMARY

Systems and methods for managing operation of at least one software virtualized network (VN) are provided. Context information associated with the VN is used to analyze a state of the VN. At least one configuration change is caused to the VN in response to analysis of the state of the VN. A change is identified to the state of the VN caused by the configuration change. A determination is made as to whether or not the change to the state of the VN is an improvement to operation of the VN. A response to the determination is made by causing at least one other configuration change to the VN.

In one embodiment, the context information comprises at least one of (a) context information received by the system in real time during operation of the VN during a first time period; (b) historical context information describing operation of the VN during a second time period prior to the first time period; and (3) meta context information that describes factors external to operation of the VN that may affect operation of the VN during a third time period subsequent to the first time period.

In one embodiment, using context information comprises using historical context information to anticipate changes to the state of the VN during the first time period. In one embodiment, the VN comprises a plurality of virtual machines (VMs) and the historical context information comprises demand on the plurality of virtual machines. In one embodiment, causing a configuration change comprises adding at least one VM to the VN during the first time period in response to demand on the plurality of VMs exceeding a predetermined threshold during the second time period. In one embodiment, using context information comprises using real time context information to anticipate changes to operation of the VN. In one embodiment, using context information comprises identifying a source of meta context information, receiving the meta context information from the source, and determining that the meta context information is relevant to operation of the VN during the third time period. In one embodiment, the operation of making the determination comprises selecting at least one performance indicator associated with the VN and monitoring the at least one performance indicator. In one embodiment, selecting the at least one performance indicator comprises selecting at least one of virtual CPU utilization, virtual memory utilization, net throughput, and queries per second to the VN as the at least one performance indicator. In one embodiment, the operation of making comprises correlating a change in state of the performance indicator to a change in state of the VN.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
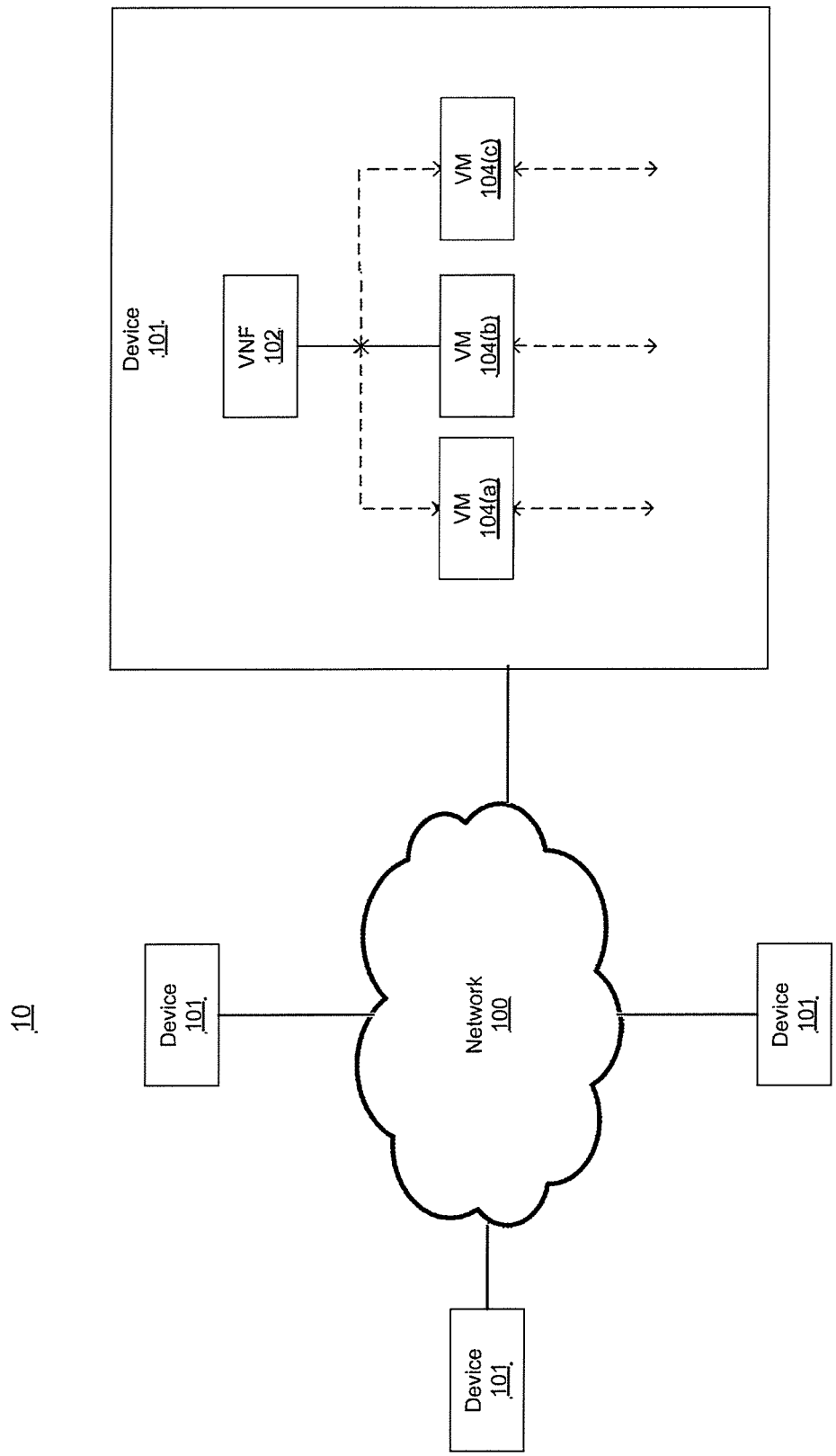
FIG. 1A is a representation of an exemplary system including a plurality of devices forming a virtualized network.

FIG. 1A is a representation of an exemplary system 10. System 10 in one example comprises a network 100 of devices 101. In one embodiment, the network 100 of devices 101 may comprise a virtualized network (VN). A VN in one example is a network that utilizes on or more virtual elements to perform certain functions. The virtual elements are assigned to hardware residing on the devices 101. An example of a VN is a software defined network (SDN).

Exemplary devices 101 may include switches, routers, base station, mobile devices, desktop computers, and/or servers. Network 100 in one example may be part of one or more cloud computing infrastructures operated by one or more cloud service providers. In another example, network 100 may be part of a proprietary network operated by one or more entities, such as network service providers, telecommunications providers, corporations, or other organizations that provide network services to users. Virtualized functions may be implemented using one or more devices 101 in lieu of having dedicated hardware for every network function. That is, general purpose hardware of network 10 may be configured to run virtualized functions to support communication services, such as mobility services, including consumer services and enterprise services. These services may be provided or measured in sessions. For example, one or more virtualized functions may be dynamically created and terminated as needed. Examples of virtualized functions include, but are not limited to, session boarder controllers, load balancers, firewalls, intrusion detection devices, and WAN accelerators.

Referring further to FIG. 1A, one example a virtual network function (VNF) 102 is shown instantiated on a device 101. A VNF 102, in one example, is a logical concept in which one or more virtual machines (VMs) 104 in the aggregate perform the functionality of the VNF 102. Each VNF 102 may have a VNF type that indicates its functionality or role. VMs 104 that perform the functionality of a VNF 102 may reside on the same device 101 or be distributed over a plurality of devices 101. Each device 101 may include a hypervisor or the like that may be used to generate one or more VNFs 102 and/or VMs 104 to perform the functionality of the VNF 102. Referring to further to FIG. 1A, VNF 102 is shown as including VM 104(*a*), VM 104(*b*), and VM 104(*c*), each of which may consume various network resources from one or more devices 101. In another embodiment, a VN may be a network that employs operating-system level virtualization which provides isolated user space instances, or containers. An example would be the application container technologies called Docker. In such an instance, the context information will be pertinent to the containers on VN. In another example, individual applications may reside on a device 101 and the context information would be application-specific contextual information.

Figure 1B:
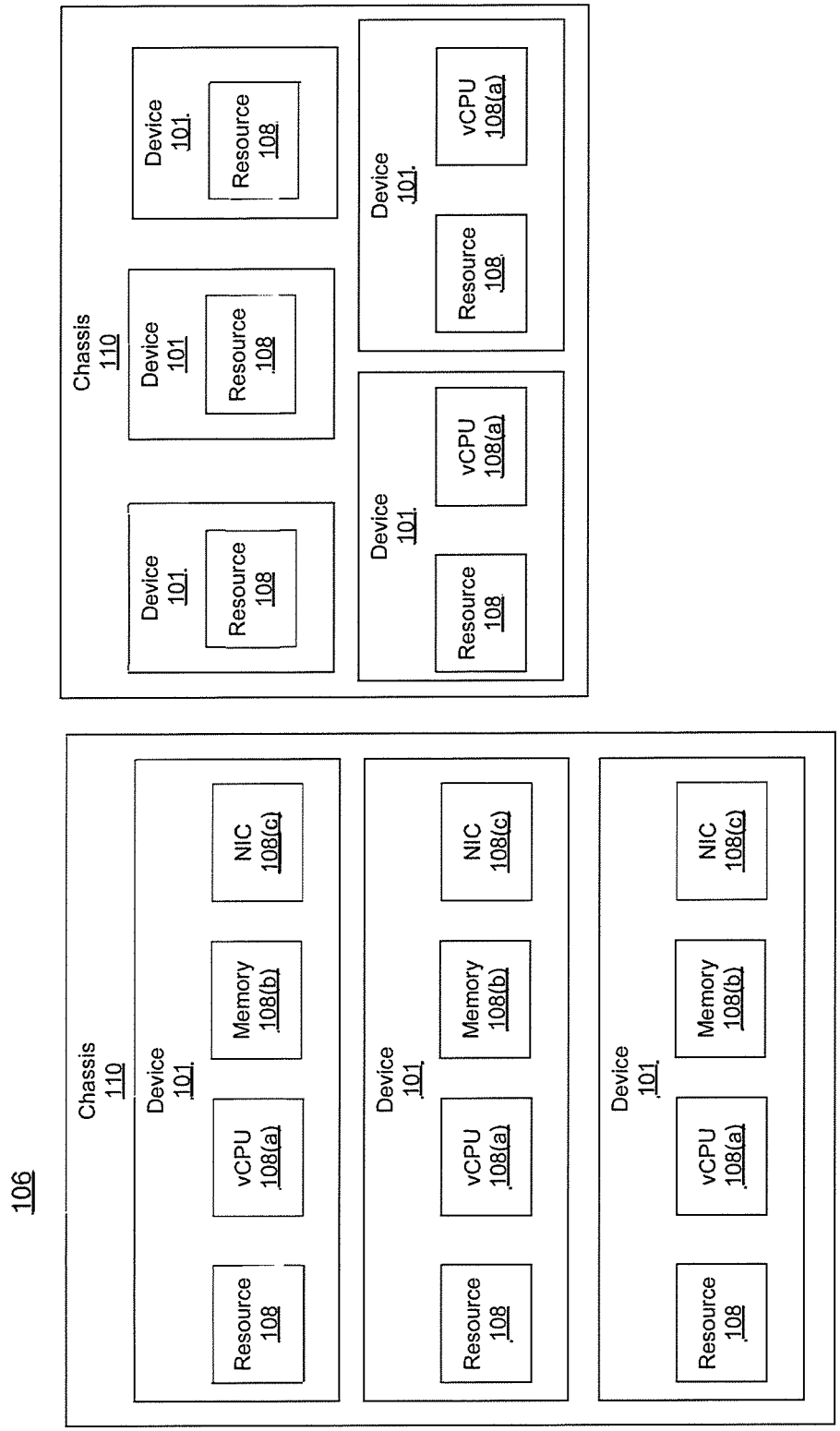
FIG. 1B is a representation of an exemplary hardware platform that may be utilized in the system of FIG. 1A.

Referring to FIG. 1B, in one example, a hardware platform 106 is shown. In one example, hardware platform 106 may comprise a collection of one or more devices 101 (e.g. servers) that are operating in geographic location. As depicted in FIG. 1A, hardware platform 106 may include one or more VNFs 102 operating on devices 101 through utilization of resources 108. Examples of resources 108, include, but are not limited to, a virtual central processing unit (vCPU) 108(*a*), memory 108(*b*) or a network interface card (NIC) 108(*c*). A vCPU 108(*a*) in one example is virtualized element that provides the functionality of a central processing unit (CPU). A vCPU 108(*a*) may be operated by utilizing one or more hardware CPUs operating on one or more devices 101. Memory 108(*b*) may be storage provided on device. Memory 108(*b*) may be allocated as virtualized memory that may instantiated on device 101 to provide virtual memory for a VNF 102 and/or VM 104. NIC 108(*c*) may be network interface card that resides on device 101 and may be instantiated as one or more virtualized elements to support a VNF 102 or VM 104. Additionally or alternatively, hardware platform 106 may include other types of resources 108. One or more hardware platforms 106 may reside in a same geographic location or they may be distributed over multiple geographic locations.

While FIG. 1A illustrates resources 108 as collectively contained in a hardware platform 106, the configuration of hardware platform 106 may isolate, for example, certain memory 108(*c*) from other memory 108(*c*). FIG. 1B provides an exemplary implementation of hardware platform 106. Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more devices 101. Devices 101 may comprise general purpose computer hardware or a computer. In an aspect, chassis 110 may comprise a metal rack, and devices 101 of chassis 110 may comprise blade servers that are physically mounted in or on chassis 110.

Each device 101 may include one or more network resources 108, as illustrated. Devices 101 may be communicatively coupled together (not shown) in any combination or arrangement. For example, all devices 101 within a given chassis 110 may be communicatively coupled. As another example, devices 101 in different chasses 110 may be communicatively coupled. Additionally or alternatively, chasses 110 may be communicatively coupled together (not shown) in any combination or arrangement.

The characteristics of each chassis 110 and each device 101 may differ. For example, FIG. 1B illustrates that the number of devices 101 within two chasses 110 may vary. Additionally or alternatively, the type or number of resources 110 within each device 101 may vary. In an aspect, chassis 110 may be used to group devices 101 with the same resource characteristics. In another aspect, devices 101 within the same chassis 110 may have different resource characteristics.

Given hardware platform 106, the number of sessions that may be instantiated or the transaction rate may vary depending upon how efficiently resources 108 are assigned to different VMs 104. For example, assignment of VMs 104 to particular resources 108 may be constrained by one or more rules. For example, a first rule may require that resources 108 assigned to a particular VM 104 be on the same device 112 or set of devices 101. For example, if VM 104 uses two vCPUs 108(*a*), 1 GB of memory 108(*b*), and 2 NICs 108(*c*), the rules may require that all of these resources 108 be sourced from the same device 101. Additionally or alternatively, VM 104 may require splitting resources 108 among multiple devices 101, but such splitting may need to conform to certain restrictions. For example, resources 108 for VM 104 may be able to be split between two devices 101. Default rules may apply. For example, a default rule may require that all resources 108 for a given VM 104 must come from the same device 101.

An affinity rule may restrict assignment of resources 108 for a particular VM 104 (or a particular type of VM 104). For example, an affinity rule may require that certain VMs 104 be instantiated on (that is, consume resources from) the same device 101 or chassis 110. For example, if VNF 102 uses 6 VMs 104(*a*), an affinity rule may dictate that those six VMs 104(*a*) be instantiated on the same device 101 (or chassis 110). As another example, if VNF 102 uses VMs 104(*a*), VMs 104(*b*), and a third type of VMs 104(*c*), an affinity rule may dictate that at least the VMs 104(*a*) and the VMs 104(*b*) be instantiated on the same device 101 (or chassis 110). Affinity rules may restrict assignment of resources 108 based on the identity or type of resource 108, VNF 102, VM 104, chassis 110, device 101, or any combination thereof.

An anti-affinity rule may restrict assignment of resources 108 for a particular VM 104 (or a particular type of VM 104). In contrast to an affinity rule—which may require that certain VMs 104 be instantiated on the same device 101 or chassis 110—an anti-affinity rule requires that certain VMs 104 be instantiated on different devices 101 (or different chassis 110). For example, an anti-affinity rule may require that VM 104(*a*) be instantiated on a particular device 101 that does not contain any VM 104(*b*). As another example, an anti-affinity rule may require that VM 104(*a*) for a first VNF 102 be instantiated on a different device 101 (or chassis 110) than VM 104(*a*) for a second VNF 102. Anti-affinity rules may restrict assignment of resources 108 based on the identity or type of resource 108, VNF 102, VM 104, chassis 110, device 101, or any combination thereof.

Within these constraints, resources 108 of hardware platform 106 may be assigned to instantiate VMs 104, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular hardware platform 106.

Figure 2A:
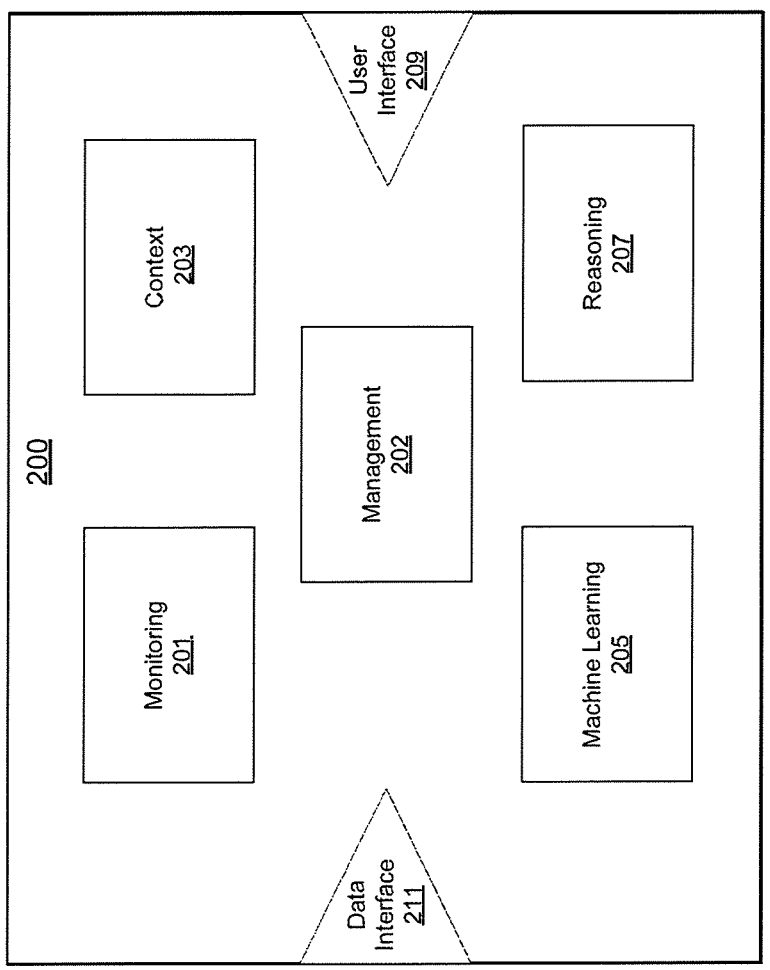
FIG. 2A is a representation of a system for managing a virtualized network within the system of FIG. 1A.

Referring to FIG. 2A, a system 200 for managing network 10 is provided for illustrative purposes. System 200 may be established as a centralized standalone device 101 of network 10 or the functionality of system 200 may be distributed across the functional devices 101 of network 10 (e.g. hypervisors, switches, etc.). System 200, in one example, may comprise one or more VNFs 102 or VMs 104. The following components of system 200 are shown for illustrative purposes only and should not be construed as limiting. The functionality of system 200 may be combined or divided as appropriate.

System 200 in one example may be an intelligent agent that is configured to manage network 100. System 200 may monitor network 100 through the use of sensors or one or more sensing operations. System 200 may analyze the state of network 100. In one example, analyzing the state of the network 100 may involve utilizing context information to determine if one or more changes would be worthwhile to improve the performance of network 100. If one or more changes would be worthwhile to improve the performance of network 100, then system 200 may cause the network to change. In one example, causing the network 100 to change may involve changing the configuration of network 100 by instructing one or more devices 101 to instantiate one or more VNFs 102 and/or VMs 104. System 200 will continue to monitor the state of network 10 to determine if the impact of the change to the network 100. In one example, system 200 may utilize machine learning and/or artificial intelligence to determine if the changes improves or degrades the operation of the network 100. In response to such a determination, system 200 may elect to cause another change to the network 100 and so forth.

In one embodiment, system 200 includes a monitoring component 201, a management component 202, a context component 203, a machine learning component 205, a reasoning component 207, and user interface 209, and a data interface 211.

Monitoring component 201, in one example, monitors the state of network 100. In one example, monitoring component 201 may monitor the state of network 100 through data interface 211, which is configured to communicate with the devices 101 making up network 100. The state of network 100 may be determined by monitoring one or more devices 101, VPNs 102, VMs 104, and resources 108 of network. Such monitoring may occur by measuring key performance indicators (KPIs) relating to the operating state of network 100. Such monitoring may occur in real time, through periodic sampling, through push communications received from devices 101, VPNs 102, VMs 104, and resources 108 or through periodic polling of such elements.

In one example, selection of KPIs will depend on the goals for operating network 100. KPIs include, but not limited to, CPU usage, memory usage, total requests for services or resources over a particular time period, operating speed of network components, throughput, energy consumption, and/or operating costs. One or more KPIs may be selected by monitoring component 201 in accordance with user input provided by the operator of system 200 or through utilization of machine learning and/or artificial intelligence. One or more KPIs may be selected in accordance with one or more operating criteria specified by an operator or an artificial intelligence or machine learning component of system 200.

An example of KPI selection will now be provided for illustrative purposes. In one example, a network operator may determine that the response time for network 100 is of primary importance. This determination may be service wide determination or it may relate to a particular service that users consume from network (e.g. video data). This determination may also apply to particular time period (e.g. after business hours when demand is high) or geographic location, or may not be so constrained. In the current example, network operator provides system 200 with the operating guideline to maximize network throughput for a particular service during a particular time period. Accordingly, during the time period, monitoring component 201 monitors one or more KPIs that relate to response time to the particular service. Such KPIs may be the overall time period that it takes to respond to a request for a service. However, there may be more granular KPIs. For example, monitoring component 201 may monitor vCPU 108(*a*) and memory 108(*b*) usage. If there is vCPU 108(*a*) and memory usage 108(*b*) that exceeds a certain percentage of system resources, then it may be worthwhile to add additional vCPU 108(*a*) and memory 108(*b*) resources to network 100. More vCPUs 108(*a*) and memory 108(*b*) will reduce latency. Therefore, system 200 may elect to increase such resources running on network 100 to reduce latency.

In another example, an operator may want to limit the operating cost of network 100. One way to minimize operating cost is to reduce power consumption. One way to reduce power consumption is to minimize the number of resources 108 in use on network 100. Therefore, system 200 may elect to monitor energy consumption and reduce the number of VNFs 102 operating on network 100 if energy consumption exceeds a predetermined threshold. In another example, it may be desirable to monitor multiple KPIs. For instance, energy consumption and throughput may be monitored to allow system 200 to identify a balance between energy consumption and throughput. The preceding examples of KPI selection and usage are provided for illustrative purposes only. It should be recognized that KPI selection and usage may be determined by system 200 in accordance with the machine learning and artificial intelligence models described herein as well as operator input.

Referring further to FIG. 2A, management component 202 is utilized by system 200 to cause changes in the configuration of network 100. In one example, management component 202 may cause changes to VNFs 102 and/or VMs 104 at one site within network 100. In another example, management component 202 may manage VNFs 102 and/or VMs 104 at multiple sites. In another embodiment, management component 2020 may manage VNFs 102 and/or VMs 104 for a portion of a site or a portion of multiple sites.

In one embodiment, management of VNFs 102 and VMs 104 may include receiving requests, from other components of system 200, for configuration changes to network 100 and implement such changes. Changes may include addition and deletion of VNFs 102 and VMs 104. Adding a VNF 102 and/or VM 104 may include determining how, when, where, and with what resources 108 to instantiate the VNF 102 and/or VM 104. In one example, management of VMs 104 may include detecting the need for one or more VMs 104 and causing the VMs 104s to be instantiated. In one example, instantiating a VM 104 may involve identifying or locating resources 108 and directing the resources 108 to instantiate the VM 104.

Referring further to FIG. 2A, context component 203 in one example is one or more databases that store the real time, historical, and meta (or environmental) state of network 100. In one example, context component 203 receives and stores the real time state data received by monitoring component 203. In another example, context component 203 stores historical state data that reflects the past operating state of network 100. Such historical context information could include prior data received by monitoring component 201 and/or historical data received from other components of network 100, such as system administrative components and network administrators. In another example, context component may store meta information that it receives from others systems, such as other systems of the operator of network 100 or third party systems. In one example, these systems may be systems with data or information that may allow system 200 to anticipate changes to network operation. Examples include, but are not limited to, news sources, weather sources, network security sources, and the like. Using such information, system 200 may be able to predict situations that affect the capability of network 100 to provide service or cause changes in demand. Such situations may make it desirable to change the configuration of network 100 by, for example, add additional VNFs 102 or move VNFs 102 to different locations.

Referring further to FIG. 2A, machine learning component 205 provides the functionality by which system 200 utilizes context information to manage network 100 without operator intervention. In the preceding discussion of monitoring component 201, the disclosure discussed monitoring KPIs to make a determination of state of the state of network 100. For instance, monitoring vCPU 108(a) usage and memory 108(b) usage to determine the state of network demand, throughput, and power consumption was discussed. In one example, the real time measurement of such KPIs may be received by machine learning component 205. Machine learning component 205 may receive such information directly from monitoring component 201 or from context component 203. Machine learning component 205 may use this real time information and monitor it with the historical and meta contexts provided by context component 203. Such analysis may involve making a determination that based on historical and meta context, the configuration of network 100 should change. Accordingly, machine learning component may direct network 100 to add one or remove one or more VNFs 102 and/or VMs 104 to network 100.

An example will now be provided for illustrative purposes. In one example, one or more vCPUs 104(a) on network 100 may be operating at 80% capacity. Machine learning component 205 will analyze real time context data (80% capacity) within the historic or meta context provided by context component 203. Such an analysis may show that network 100 response time degrades beyond an acceptable threshold when such a network 100 state occurs. For example, the historical context may indicate that 80% vCPU 104(a) capacity after 5 PM combined with a meta context of a major news event will degrade performance. Accordingly, machine learning component 205 will identify that configuration change may be necessary in which case it may request network 100 to instantiate additional vCPU 104 capacity on network.

Referring further to FIG. 2A, reasoning component 207 in one embodiment provides the functionality that allows system 100 to reflect 200 and/or refine the actions that it takes with respect to certain network 100 states. For instance, machine learning component 205 may identify that vCPU utilization greater than 80% may cause degradation of network performance within certain other contextual conditions, but identifying such degradation does not provide a prescription as to how to respond to such a condition. Accordingly, reasoning component 207 may elect to employ a methodology to respond. In one example, reasoning component 207 may employ A/B testing or split testing by which one alternative is tried and then another alternative is tried. For example, reasoning component 207 may instantiate one number of VNFs 102 and/or VMs 104 to lessen the vCPU load and monitor the response of network 100. Reasoning component may then instantiate another number of VNFs 102 and/or VMs 104 and monitor network's 100 response. In another embodiment, reasoning component 207 may employ grid testing, by which a grid of possible actions is tested in order to identify an optimal response. The number of VNFs 102 and/or VMs 104 to instantiate will then be selected based on the evaluation criteria used to evaluate network's 100 response. The criteria may include one or more KPIs. It should be noted that reasoning component 207 may elect to perform testing activities in a manner that limits the effect that testing may have network's 100 performance. For instance, reasoning component may confine testing to certain times of the day, to certain geographic locations, or to certain data platforms 106. After observing the results of testing, reasoning component 207 may elect to implement changes to the network 100 in a broader way.

Referring further to FIG. 2A, in one embodiment, system 200 may include a user interface 209. User interface 209 may be used by operators of system 200 or of network 100 to direct system 200 as to how, when, where, and why to make changes to network 100. For example, a user may instruct system 200 to increase and/or reduce the number of VMs 104 in response to certain network conditions. A user may instruct system 200 to monitor a particular KPI. A user may provide a particular context to system in order to allow machine learning component 205 and reasoning component 207 to understand network's 100 operating state in a more complete fashion. User interface 209 may reject user input in certain situations. For instance, machine learning component 205 and reasoning component may determine that instructions contained in user input may degrade rather than enhance the performance of network 100 and therefore reject or ignore the user input. In another example, a particular user may not have clearance or authority to provide certain input and therefore it would be ignored or rejected. In another example, machine learning component 205 and/or reasoning component 207 may determine that a user is not sufficiently experienced with system 200 to direct system in the manner provided by user input. Such a determination may be made by analyzing the user's credentials, analyzing previous interactions with the user, and/or by analyzing the user input itself. For instance, user input directing system to configure network 100 in a careless way may indicate that a user does not have the experience to operate network 100.

Referring further to FIG. 2A, data interface is 211 is configured to communicate with one or more hardware platforms 106 and with one or more networks. In one example, requests for VMs 104 may be received or identified by data interface 211 and then routed to components of system 200 for processing. In one example, when a determination to configure network 100 is made by system 200, implementation instructions may be transmitted through data interface 211 to one or more devices 101.

Figure 2B:
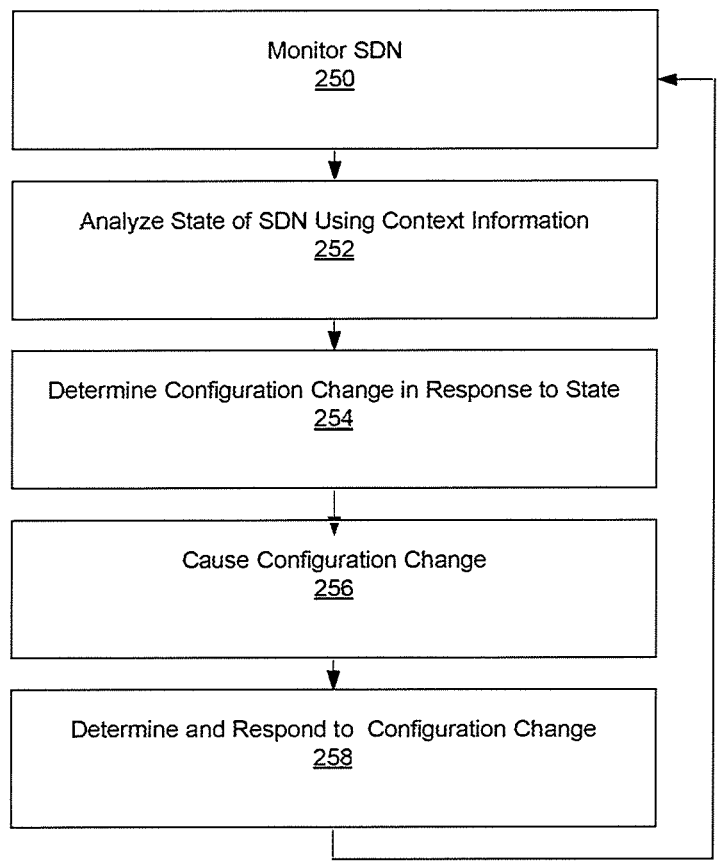
FIG. 2B is a flowchart depicting an exemplary embodiment of a process of operation of the system of FIG. 2A.

Referring to FIG. 2B, a method 240 of operation for system 200 is now provided for illustrative purposes.

In step 250, system 200 monitors network 100. Monitoring of network 100 may occur through monitoring the state of one or more devices 101 operating on network. In one example, the state may be monitored through receipt of information, through data interface 211, from one or more devices 101. The information may include operating statistics for devices 101, VNFs 102, and/or VMs 104 or for network 100 as a whole. The operating statistics may include information such as bandwidth measurement, memory usage, CPU usage, I/O rates, user requests, latency, and the like. The information may be received in real time or it may be transmitted periodically by devices 101. The information may also be transmitted in response to requests by system 200.

In step 252, the state of network is analyzed, by machine learning component 205 and reasoning component 207, through the use of context information provided by context component 203.

In one example, the context information may be information received by the system 200 in real time during operation 100. Machine learning component 205 and/or reasoning component 207 may use real time information to infer changes to the operating state of network 100 during subsequent time periods. For instance, a decrease in demand relative to a particular threshold for a particular VNF 102 may indicate that the number of instances of the VNF 102 should be reduced.

In one example, the context information may be historical information describing operation of the network. Such historical information may allow system 200 to predict possible changes to the state of network 100 during a subsequent time period and make changes to the configuration of network 100 before such state changes occur. For instance, the demand on particular VNFs 102 may increase rapidly during particular times of the day. Accordingly, machine learning component 205 and reasoning component 207 may increase the number of VNFs 102 during that time of day.

In another example, the context information may be meta-context information that describes factors external to operation of the network 100 that may affect operation of the network. For instance, a predicted weather disaster may indicate that a geographical portion of network 100 may no longer be able to support certain VNFs 102. Accordingly, system 200 may choose to cause duplicates of those VNFs 102 to be added to another part of network 100. In one embodiment, reasoning component 207 may identify and select meta-context information sources through use of other context information. For instance, historical context information may indicate that resources 108 in certain areas of the country see decreased demand during certain months. Reasoning component 207 may seek out and identify meta-context information sources that would explain the decreased demand.

In step 254, system 200 determines how to change the configuration of network 100 in response to the analysis of the operating state of network 100. In one example, this may entail adding instance of VNFs 102 and/or VMs 104 to network 100. In one example, this may entail removing instances of VNFs 102 and/or VMs 104 to network 100. In one example, this may entail shifting certain VNFs 202 and/or VMs 104 to other network resources 108.

In step 256, system 200 causes the configuration change. In one example, a configuration change is caused by instructing a device to instantiate a VNF 102 and/or VM 104 on one or more devices 101. In another example, system 200 may instruct one or more devices 101 to remove a VNF 102 and/or VM 104.

In step 258, system 200 determines and responds to the configuration change made in step 256. In one example, such a determination and response may be implemented by returning to step 250 and beginning the method 240 over again. In another example, system 200 may focus on or more KPIs and identify an optimum configuration for network 100. For instance, system 200 may engage use A/B testing or grid testing to identify a network configuration that provides an optimum value for one or more KPIs.

Figure 3:
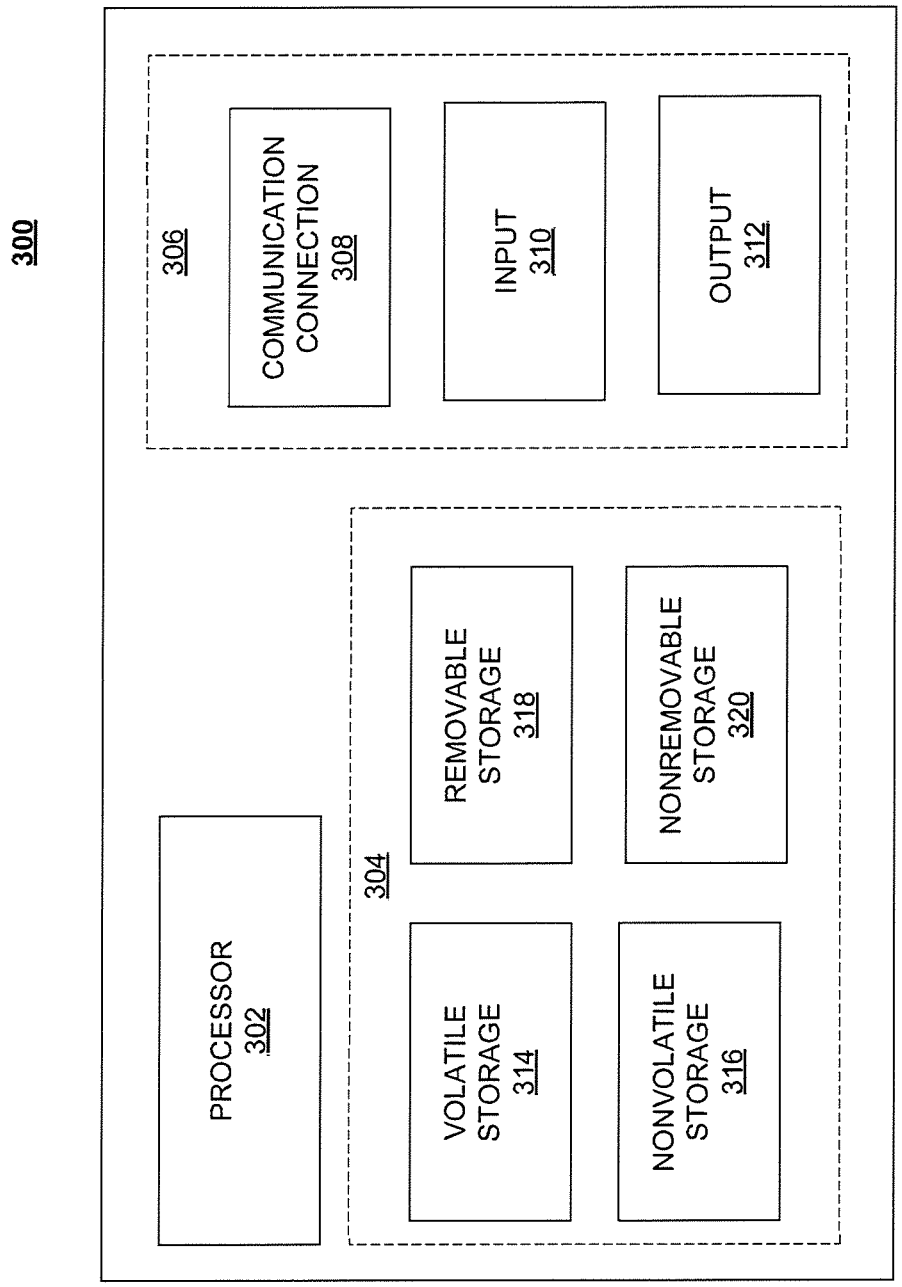
FIG. 3 is a representation of a network device according to an example.

Referring to FIG. 3, a system 200 may be implemented on a network device, an example of which is illustrated in FIG. 3 as a functional block diagram. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
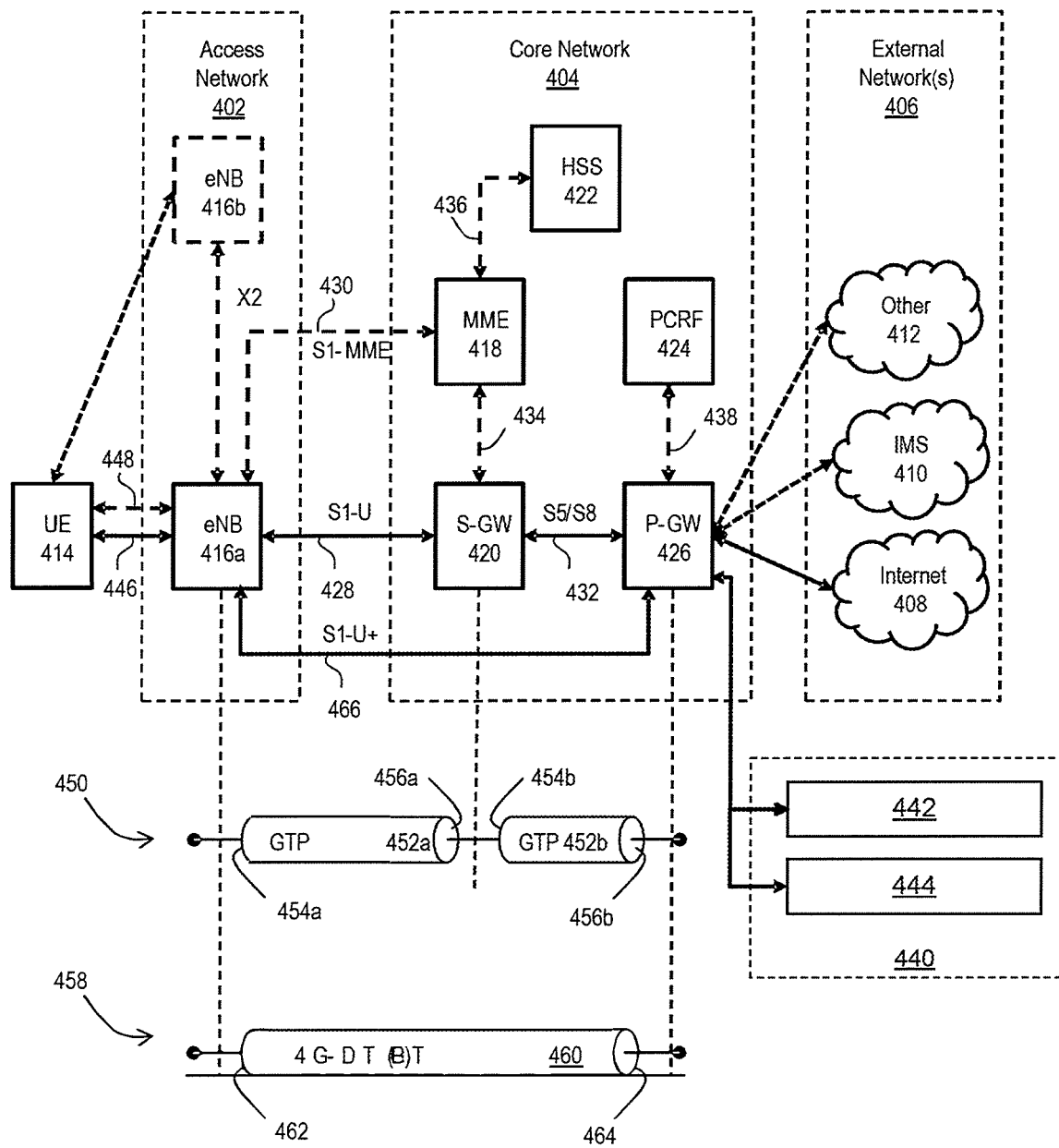
FIG. 4 depicts an exemplary communication system that provide wireless telecommunication services over wireless communication networks that may be at least partially virtualized.

FIG. 4 illustrates a functional block diagram depicting one example of an LTE-EPS network architecture 400 that may be at least partially implemented as an SDN. In one example, network 100 may comprise all or a portion of network architecture 400. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
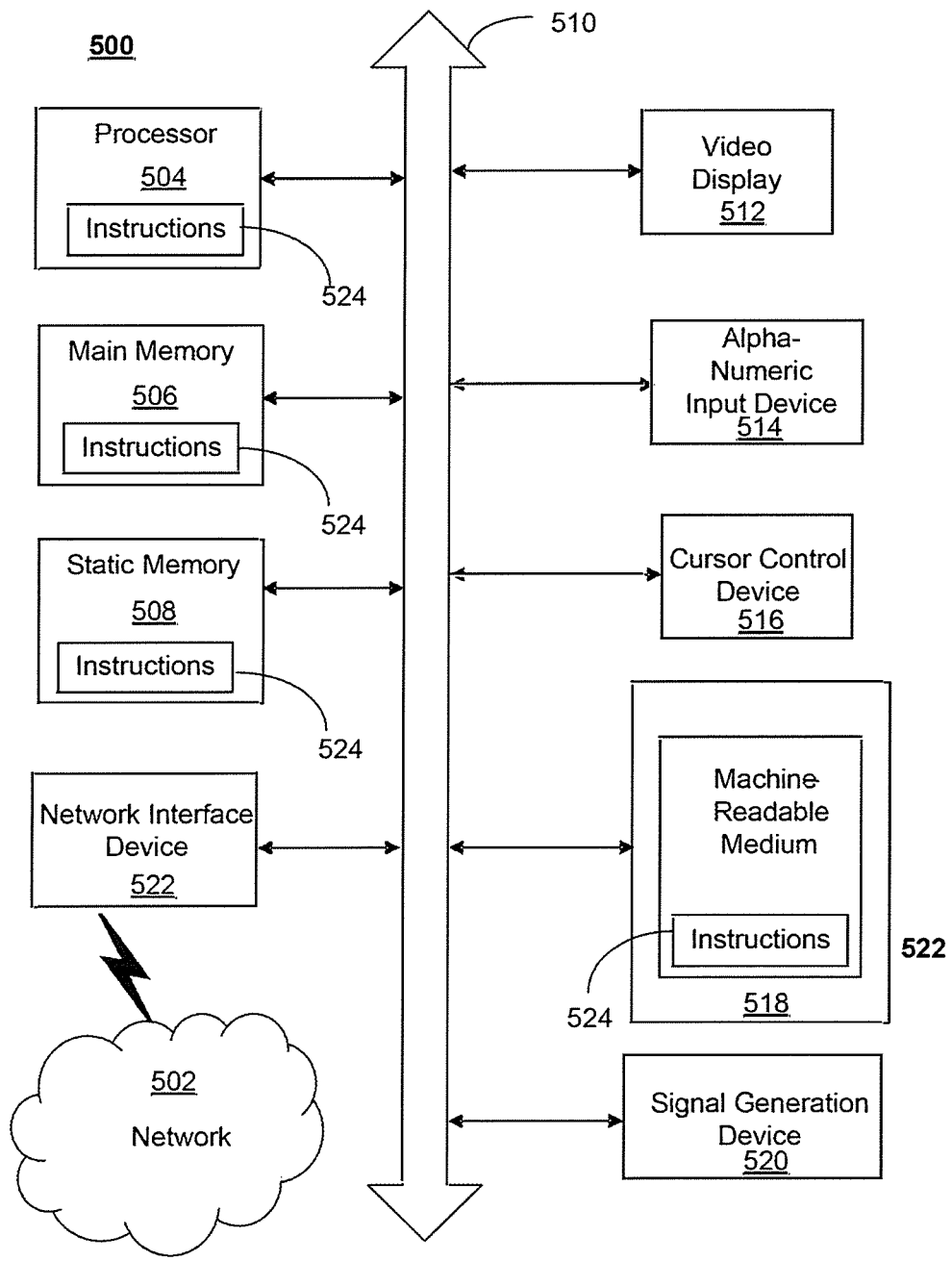
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described herein. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

While examples of systems and methods for management of virtualized devices have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

What is claimed:
1. A system comprising:
   a processing system comprising one or more processors; and
   a memory coupled with the one or more processors, the memory storing executable instructions that when executed by the one or more processors cause the one or more processors to effectuate operations comprising:
      causing at least one configuration change to a virtualized network (VN) based on context information associated with the VN;
      identifying a change to a state of the VN caused by the configuration change; and
      instantiating at least one virtual network function or virtual machine that is directed at creating a response to an evaluated impact of the change to the state of the VN.

2. The system of claim 1, wherein the context information comprises context information received by the system in real time during operation of the VN during a first time period.

3. The system of claim 2, wherein the context information comprises historical context information describing operation of the VN during a second time period prior to the first time period.

4. The system of claim 2, wherein the context information comprises meta context information that describes factors external to operation of the VN that may affect operation of the VN during a third time period subsequent to the first time period.

5. The system of claim 2, wherein the operations further comprise using historical context information to anticipate changes to the state of the VN during the first time period.

6. The system of claim 1, wherein the VN comprises a plurality of virtual machines (VMs) and a historical context information that comprises demand on the plurality of virtual machines.

7. The system of claim 1, wherein the operation further comprise using real time context information to anticipate changes to operation of the VN.

8. The system of claim 1, wherein the operations comprise making a determination that comprises:
 selecting at least one performance indicator associated with the VN; and
 monitoring the at least one performance indicator.

9. The system of claim 4, wherein the operations comprise using context information that comprises:
 identifying a source of meta context information;
 receiving the meta context information from the source; and
 determining that the meta context information is relevant to operation of the VN during the third time period.

10. The system of claim 8, wherein the selecting the at least one performance indicator comprises selecting at least one of virtual central processing unit (CPU) utilization, virtual memory utilization, net throughput, and queries per second to the VN as the at least one performance indicator.

11. The system of claim 8, wherein the making of the determination comprises correlating a change in state of the performance indicator to a change in the state of the VN.

12. A method comprising:
 causing, by a processing system including a processor, at least one configuration change to a virtualized network (VN) based on context information associated with the VN;
 identifying, by the processing system, a change to a state of the VN caused by the configuration change; and
 instantiating, by the processing system, at least one virtual network function or virtual machine that is directed at creating a response to an evaluated impact of the change to the state of the VN.

13. The method of claim 12, wherein the context information comprises context information received by the processing system in real time during operation of the VN during a first time period.

14. The method of claim 13, wherein the context information comprises historical context information describing operation of the VN during a second time period prior to the first time period.

15. The method of claim 13, wherein the context information comprises meta context information that describes factors external to operation of the VN that may affect operation of the VN during a third time period subsequent to the first time period.

16. The method of claim 13, further comprising using, by the processing system, historical context information to anticipate changes to the state of the VN during the first time period.

17. The method of claim 12, wherein the VN comprises a plurality of virtual machines (VMs) and a historical context information that comprises demand on the plurality of virtual machines.

18. The method of claim 12, further comprising using, by the processing system, real time context information to anticipate changes to operation of the VN.

19. A non-transitory, computer readable storage medium storing computer executable instructions that when executed by a computing device cause the computing device to effectuate operations comprising:
 causing at least one configuration change to a virtualized network (VN) based on context information associated with the VN;
 identifying a change to a state of the VN caused by the configuration change; and
 instantiating at least one virtual network function or virtual machine that is directed at creating a response to an evaluated impact of the change to the state of the VN.

20. The non-transitory, computer readable storage medium of claim 19, wherein the operations further comprise using historical context information to anticipate changes to the state of the VN during a first time period.

* * * * *